United States Patent [19]
Kawabata et al.

[11] Patent Number: 5,277,238
[45] Date of Patent: Jan. 11, 1994

[54] PNEUMATIC RADIAL TIRES FOR PASSENGER CARS

[75] Inventors: Misao Kawabata, Tokorozawa; Hisao Ushikubo, Kodaira; Yutaka Yamaguchi, Urawa; Katsutoshi Tani; Hiroo Matsunaga, both of Kodaira, all of Japan

[73] Assignee: Bridgestone Corporation, Tokyo, Japan

[21] Appl. No.: 798,950

[22] Filed: Nov. 27, 1991

[30] Foreign Application Priority Data

Nov. 29, 1990 [JP] Japan .................. 2-325764

[51] Int. Cl.$^5$ ............................... B60C 9/20
[52] U.S. Cl. .................... 152/526; 152/533; 152/538
[58] Field of Search ............ 152/526, 533, 538, 209

[56] References Cited

U.S. PATENT DOCUMENTS

| | | |
|---|---|---|
| 3,991,803 | 11/1976 | Praszek . |
| 4,869,307 | 9/1989 | Bormann et al. .............. 152/533 |
| 4,987,938 | 1/1991 | Ushikubo et al. .............. 152/533 |
| 4,989,658 | 2/1991 | Maathuis et al. .............. 152/533 |

FOREIGN PATENT DOCUMENTS

| | | |
|---|---|---|
| 0258822 | 3/1988 | European Pat. Off. ........... 152/533 |
| 0333628 | 9/1989 | European Pat. Off. . |
| 0402303 | 12/1990 | European Pat. Off. ........... 152/454 |
| 0414470 | 2/1991 | European Pat. Off. ........... 152/533 |
| 0462733 | 12/1991 | European Pat. Off. . |
| 2061202 | 5/1981 | United Kingdom . |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A high-speed running pneumatic radial tire comprises a cylindrical crown portion, a pair of sidewall portions extending inward therefrom, a radial carcass extending from one of the sidewall portions through the crown portion to the other sidewall portion, and a belt and a tread successively superimposed on the crown portion outward in the radial direction of the tire. The tread has plural rows of blocks defined by plural circumferential grooves and many lateral grooves, and the belt is comprised of at least two main crosscord belt layers and an auxiliary belt layer arranged thereon. The auxiliary belt layer is formed by spirally winding a rubberized ribbon ply of heat-shrinkable cords on the main belt layers, in which an overlapped amount of the ribbon ply is made large in a zone of the tread substantially corresponding to the block row than in a zone of the tread substantially corresponding to the circumferential groove.

15 Claims, 4 Drawing Sheets

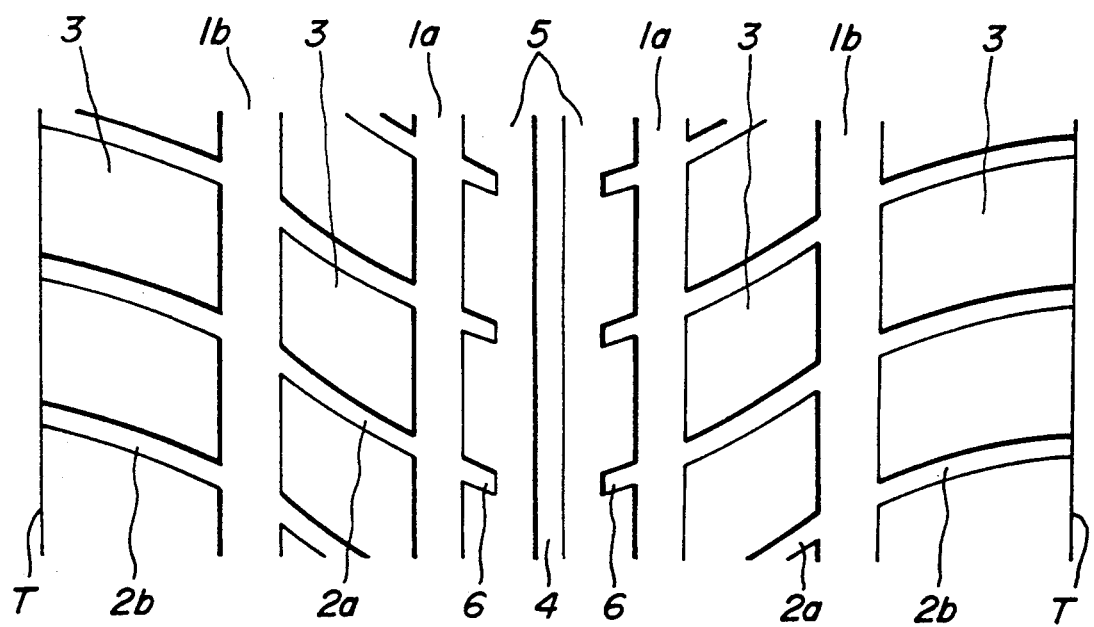
FIG_1

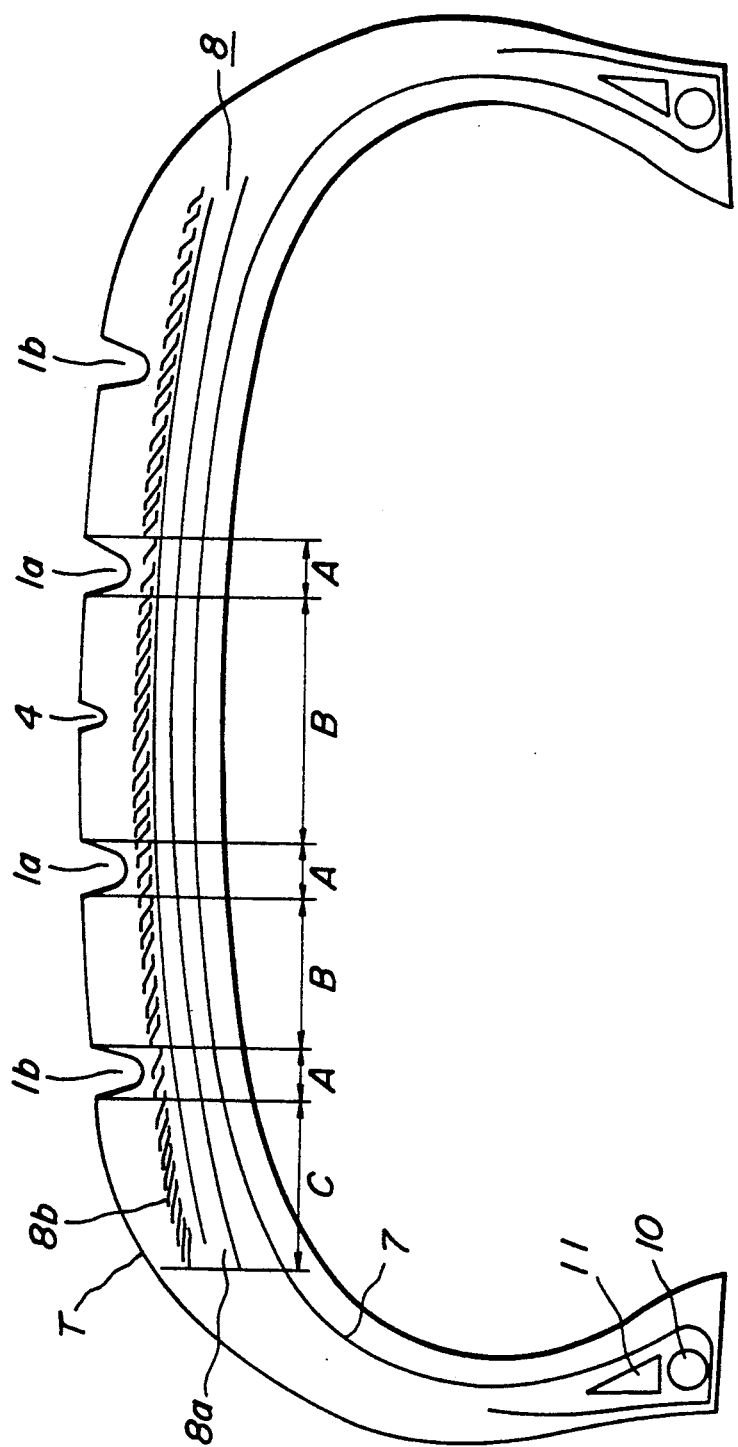

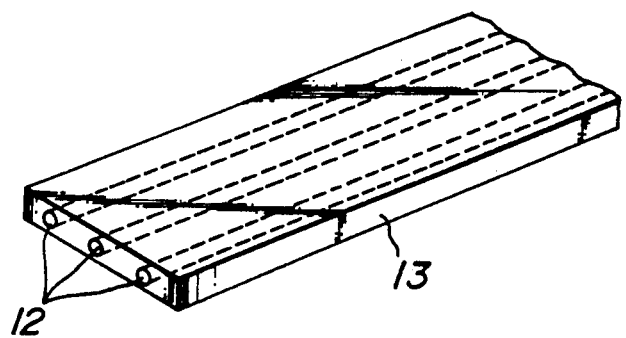
FIG_3

FIG.4a Zone A 
FIG.4b Zone B,C 
FIG.5
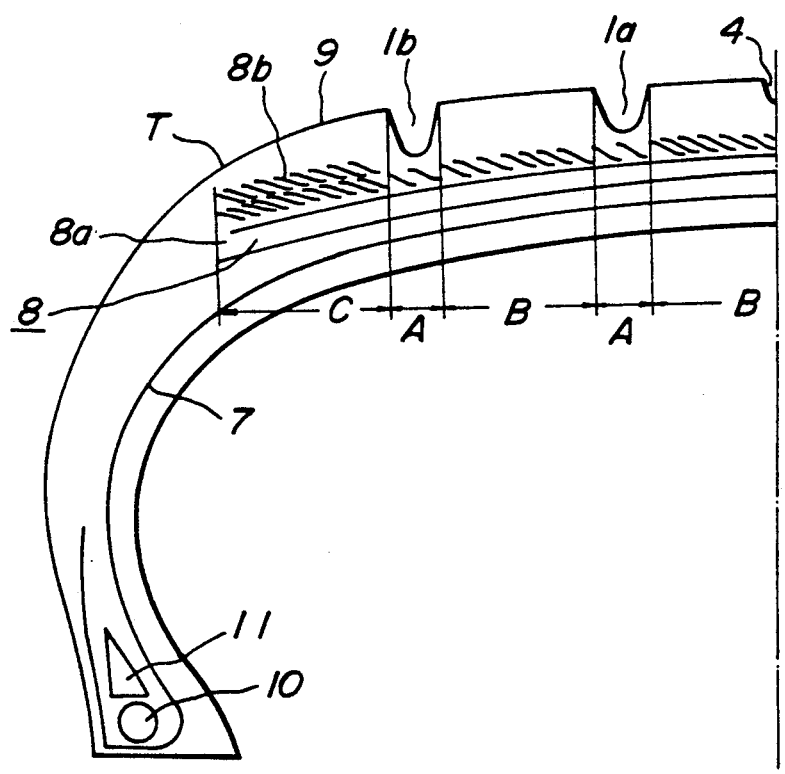

PNEUMATIC RADIAL TIRES FOR PASSENGER CARS

BACKGROUND OF THE INVENTION

1. Field of the Invention

This invention relates to pneumatic radial tire for passenger car, and more particularly to an improvement of a belt in a low-section profile radial tires running at an extremely high speed.

2. Disclosure of the Related Art

Recently, is possible to stably run a vehicle at an extremely high speed exceeding 150 km/hr with the technical innovation for passenger cars. Hence lowsection profile radial tires having an aspect ratio of not more than 0.6 (ratio of section height to maximum width in the tire) and sufficient performances even in the running at such an extremely high speed have been developed.

However, when the tire is run at extremely high speed, separation between tread and belt, chipping of tread rubber and the like particularly become a problem, and consequently it is important that the durability to these failures is high or a so-called high-speed durability is excellent.

Considering high-speed durability, there is proposed a tire structure that a rubberized fabric of organic fiber cords is spirally wound around an outermost belt layer arranged outside a carcass under a constant tension.

In general, such a tire develops sufficient performance in case of running at middle to high speeds, but is hardly said to possess sufficient performance in case of running at an extremely high speed. That is, it is required to solve the following problems.

In this tire, the tread is provided at its surface with plural circumferential grooves of relatively wide width along the circumference of the tread considering the drainage property and has a thickness that it is thin at a position of the circumferential groove and becomes thick at a position of block row between the adjoining circumferential grooves. The difference of rubber volume between the circumferential groove and the block row becomes large and consequently the protruding quantity of rubber in an outward direction of the tire through centrifugal force produced in the extremely high-speed running becomes largely different in the widthwise direction of the tread. That is, the protruding quantity at the position of the circumferential groove is slight, but the protruding quantity in the block row is large, so that the ground contact pressure of the tread becomes unequal between the position of the groove and the block to injury the steering stability in the extremely high-speed running and cause the occurrence of uneven wear.

When extremely high-speed running is continued, heat is generated due to the excessive ground contact pressure of the block row through the centrifugal force, which exceeds the heat-resistant limit of the tread rubber to cause blowing-out thereof and hence the peeling of rubber in the block row or the occurrence of so-called chunk-out. In this case the tire life becomes very short.

SUMMARY OF THE INVENTION

It is, therefore, an object of the invention to provide pneumatic radial tires having performance sufficiently durable for use in the extremely high-speed running and, being very small in the protruding quantity of rubber at the tread surface in the extremely high-speed running.

The inventors have made various studies and found that the difference of the protruding quantity at the tread surface in the widthwise direction can be made small by changing initial modulus of a belt disposed between a carcass and a tread in the widthwise direction.

According to the invention, there is the provision of a high-speed running pneumatic radial tire comprising a cylindrical crown portion, a pair of sidewall portions extending from both ends of the crown portion inward in the radial direction of the tire, a radial carcass extending from one of the sidewall portions through the crown portion to the other sidewall portion to reinforce these portions, and a belt and a tread successively superimposed on the crown portion outward in the radial direction of the tire; said tread has plural rows of blocks defined by plural circumferential grooves extending circumferentially of the tread and many lateral grooves crossing these circumferential grooves and extending substantially in parallel with each other; and said belt is comprised of at least two main belt layers each containing inextensible cords arranged at a small cord angle with respect to an equator of the tire, the cords of which layers being crossed with each other, and an auxiliary belt layer formed by spirally winding a rubberized ribbon ply containing a plurality of parallel arranged heat-shrinkable cords therein on a circumference of the main belt layers over the full width while partially overlapping said ribbon ply in the widthwise direction of the strip, characterized in that an overlapped amount of the ribbon ply in said auxiliary belt layer is made large in a zone of the tread substantially corresponding to said rows of blocks than in a zone of the tread substantially corresponding to said circumferential groove.

BRIEF DESCRIPTION OF THE DRAWINGS

The invention will be described with reference to the accompanying drawings, wherein:

FIG. 1 is a developed view of an embodiment of the tread pattern in a first embodiment of the pneumatic radial tire according to the invention;

FIG. 2 is a schematically section view of the pneumatic radial tire shown in FIG. 1;

FIG. 3 is a partial perspective view of an embodiment of the ribbon ply constituting the auxiliary belt layer in the tire according to the invention;

FIGS. 4a and 4b are schematic views illustrating an overlapped state of the ribbon ply, respectively; and FIG. 5 is a schematically section view of a second embodiment of the pneumatic radial tire according to the invention.

DESCRIPTION OF THE PREFERRED EMBODIMENTS

FIG. 1 illustrates a main part of a tread in the pneumatic radial tire according to the invention. The tread is divided into four rows in total of blocks 3 by two sets of a pair of circumferential grooves 1a, 1b, which are arranged at both sides with respect to an equator of the tire (circumference at the center of tread width) to continuously extend along the circumference of the tread substantially in parallel with each other at a certain distance, and many lateral grooves 2a connecting the circumferential grooves 1a and 1b to each other and many lateral grooves 2b connecting the circumferential groove 1b to a tread end T. Moreover, the central portion of the tread sandwiched between the circumferential grooves 1a is divided into two ribs 5 by an auxiliary circumferential groove 4 located at the center of the tread and having a depth shallower than that of the circumferential groove and a width narrower than that of the circumferential groove.

In the illustrated embodiment, the number of the circumferential grooves 1a1b is four in total, but it is preferable that the number of the circumferential grooves is 4 to 8 in total. Each of the lateral grooves 2a, 2b extends in a direction converging toward the equator of the tire at an acute angle with respect to the circumferential groove 1a1b and has a width and a depth equal to or less than those of the circumferential groove. Moreover, each of the ribs 5 is provided with a notch 6 extending in a direction converging toward the equator of the tire at a position corresponding to an extension line of the lateral groove 2a.

The structure of the tire according to the invention is shown in FIG. 2.

In FIG. 2, numeral 7 is a carcass, numeral 8 a belt, numeral 9 a tread, numeral 10 a bead core, and numeral 11 a bead filler composed of a hard rubber.

The carcass 7 is a rubberized ply containing organic fiber cords such as polyester, rayon or nylon fiber cords arranged in a direction substantially perpendicular to the equator of the tire (radial direction), each end portion of which ply is wound around the bead core 10 from inside of the tire toward outside thereof to form a turnup portion.

The belt 8 is comprised of at least two main belt layers 8a containing inextensible cords such as steel cords, aromatic polyamide fiber cords or the like arranged at a cord angle of 15°–35° with respect to the equator of the tire, the cords of those layers being crossed with each other, and an auxiliary belt layer 8b arranged on the circumference of the main belt layers 8a over the full width. Moreover, a tread 9 is arranged on the belt 8.

The auxiliary belt layer 8b is formed by spirally winding a ribbon ply, which is obtained by covering plural heat-shrinkable cords 12 (3–14 nylon cords) arranged in parallel with each other with a rubber 13 as shown in FIG. 3, on the circumference of the main belt layers 8a over the full width while partially overlapping the ribbon ply in the widthwise direction thereof.

Furthermore, the overlapped amount of the ribbon ply in the auxiliary belt layer is made large in zones B and C of the tread 9 substantially corresponding to the rows of blocks 3 than in a zone A of the tread 9 substantially corresponding to the circumferential grooves 1a, 1b as shown. For example, in FIGS. 4a and 4b, the reinforcing rigidity per unit width of the auxiliary belt layer 8b is made larger in the zones B and C than in the zone A. Preferably, the rigidity in the zones B and C is larger by 20% than that in the zone A.

The zone A corresponding to the circumferential grooves 1a, 1b is a zone having a width corresponding to 50–150% of an opening width w of the circumferential groove (hereinafter referred to as groove width) around a center of the the circumferential groove and extending along the circumferential groove, and the remaining zones are the zones B and C.

Moreover, the reinforcing rigidity M (kgf/cm$^2$) per unit width of the auxiliary belt layer is defined by the following equation:

$$M = [(F \times 50)/S] \times n$$

wherein F is a load (kgf) at 2% elongation of cord for the auxiliary belt layer taken out from the tire, S is a sectional area (cm$^2$) of cord, and n is the number of cords per unit width. The reinforcing rigidity of each zone is represented by an average value of the reinforcing rigidity M calculated from the above equation in each other zones A, B and C.

In the tire running at an extremely high speed, a very strong centrifugal force is applied as compared with the tire running at middle and low speeds, so that the tread protrudes outward in the radial direction of the tire. The protruding quantity is large in the block of the tread and small in the zone corresponding to the circumferential groove, so that the ground contact pressure becomes unequal in the widthwise direction of the tread.

According to the invention, the reinforcing rigidity per unit width of the auxiliary belt layer is changed in accordance with the above difference of the protruding quantity by adjusting the overlapped quantity of the ribbon ply arranged inside the tread in the radial direction and constituting the auxiliary belt layer, whereby the difference of the protruding quantity between block and groove is made small as far as possible.

In other words, the rigidity per unit width of the auxiliary belt layer is made large in the zones B and C corresponding to the block rows than in the zone A corresponding to the circumferential groove, whereby a high modulus is given to the block rows to suppress the increase of protruding quantity through the centrifugal force, while the modulus of the circumferential groove having a small protruding quantity is made small. Thus, the difference of the protruding quantity between the block row and the circumferential groove is made small to make the protrusion of the tread uniform in the widthwise direction.

Moreover, the protrusion of the block row through the centrifugal force tends to frequently occur in the blocks adjacent to the tread end. In order to suppress such a protrusion, it is effective to wind the ribbon ply double at the zone C corresponding to a block row 9 adjacent to the tread end T as shown in FIG. 5.

The following examples are given in illustration of the invention and are not intended as limitations thereof.

EXAMPLE 1

A pneumatic radial test tire having a tire size of 255/40 ZR17 was prepared according to the tread pattern shown in FIG. 1 and the structure shown in FIG. 2. In this test tire, the circumferential groove had a width of 10 mm and a depth of 8 mm, and the auxiliary circumferential groove had a width of 5 mm and a depth of 6 mm, and the lateral groove had a width of 5 mm and a depth of 7 mm and converged at an angle of 80° toward the equator of the tire so that an angle between the circumferential groove 1a and the lateral groove 2a was 60° and an angle between the circumferential groove 1b and the lateral groove 2b was 70°.

Outside the carcass were arranged two main belt layers each containing steel cords of 1×5 structure arranged at a cord angle of 20° with respect to the equator of the tire, and further the auxiliary belt layer was arranged on the circumference of the main belt layers over the full width by spirally winding a rubberized ribbon ply containing 11 nylon cords of 1260d/2 therein while partially overlapping the ribbon ply in the widthwise direction. In the formation of the auxiliary belt layer, the zone A beneath the circumferential groove had an overlapped quantity corresponding to ½ of the width of the ribbon ply as shown in FIG. 4a and the zones B and C corresponding to the block rows had an overlapped quantity corresponding to ⅓ of the width of the ribbon ply as shown in FIG. 4b, and consequently the reinforcing rigidity per unit width in the zone A was $4.0 \times 10^5$ kgf/cm$^2$ and the reinforcing rigidity per unit width in the zones B and C was $8.0 \times 10^5$ kgf/cm$^2$.

Further, a comparative tire having the same tread pattern and structure as in the above test tire was prepared except that the reinforcing rigidity per unit width of the auxiliary layer was uniform ($8.0 \times 10^5$ kgf/cm$^2$) over the full width as in the conventional technique.

Tests for ground contacting property, steering stability and wear resistance were made with respect to these tires to obtain results as shown in Table 1.

TABLE 1

|  | Test tire | Comparative tire |
| --- | --- | --- |
| Ground contact property | 120 | 100 |
| Steering stability | 110 | 100 |
| Wear resistance | 105 | 100 |

Moreover, the tire was mounted on a passenger car under an internal pressure of 2.5 kgf/cm$^2$ and actually run by a professional driver. These properties were evaluated by an index on the basis that the comparative tire was 100.

The ground contact property was evaluated by measuring a distribution of ground contact pressure when the tire was run at a speed of 200 km/hr under a load of 500 kg.

The steering stability was evaluated by measuring a lap time when the vehicle was run at a full throttle state on a circuit course of 2.5 km several times while including a feeling of the driver.

The wear resistance was evaluated by measuring a wear amount after the tire was run on a test course of 6 km at a speed of 150 km/hr over a distance of 5000 km.

EXAMPLE 2

A pneumatic radial test tire having a tire size of 255/40 ZR17 was prepared according to the tread pattern shown in FIG. 1 and the structure shown in FIG. 5. In this test tire, the circumferential groove had a width of 14 mm and a depth of 8.5 mm, and the auxiliary circumferential groove had a width of 5 mm and a depth of 6 mm, and the lateral groove had a width of 4 mm and a depth of 7 mm. The other structure was the same as in Example 1 except for the auxiliary belt layer.

The auxiliary belt layer was arranged on the circumference of the main belt layers over the full width by spirally winding a rubberized ribbon ply containing 11 nylon cords of 1260d/2 therein while partially overlapping the ribbon ply in the widthwise direction and partially winding double. In the formation of the auxiliary belt layer, the zone A beneath the circumferential groove had an overlapped quantity corresponding to ½ of the width of the ribbon ply as shown in FIG. 4a and the zones B and C corresponding to the block rows had an overlapped quantity corresponding to ⅓ of the width of the ribbon ply as shown in FIG. 4b. Moreover, the zone C had a double winding structure as shown In FIG. 5. Therefore, the reinforcing rigidity per unit width in the zone A was $4.0 \times 10^5$ kgf/cm$^2$, the reinforcing rigidity per unit width in the zone B was $8.0 \times 10^5$ kgf/cm$^2$ and the reinforcing rigidity per unit width in the zone C was $16.0 \times 10^5$ kgf/cm$^2$.

Further, a comparative tire having the same tread pattern and structure as in FIGS. 1 and 2 was prepared except that the reinforcing rigidity per unit width of the auxiliary layer was uniform ($8.0 \times 10^5$ kgf/cm$^2$) over the full width as in the conventional technique.

Each of these tires was subjected to an internal pressure of 2.5 kgf/cm$^2$ and pushed onto a high-speed rotating drum under a load of 500 kg and run at an initial speed of 150 km/hr for 10 minutes and then the running speed was raised at a rate of 10 km/hr every 20 minutes until the tire was broken. As a result, the test tire was not broken even at the rising rate of 40 km/hr after the breakage of the comparative tire.

Furthermore, the tire was mounted on a passenger car (get only by a driver) and run on a test course of 6 km at a speed of 150 km/hr over a distance of 5000 km. After running, the difference of worn amount between central portion and end portion of the same block in the widthwise direction of the tread was measured. As a result, the wear difference was 2.5 mm in the comparative tire and 1.9 mm in the test tire, respectively.

As mentioned above, according to the invention, the difference of protruding amount of the tread in widthwise direction can be made small as far as possible during the extremely high-speed running, so that the invention can provide pneumatic radial tires exhibiting a uniform ground contact pressure in the extremely high-speed running and having excellent steering stability and wear resistance.

What is claimed is:

1. A high-speed running pneumatic radial tire comprising; a cylindrical crown portion, a pair of sidewall portions extending from both ends of the crown portion inward in the radial direction of the tire, a radial carcass extending from one of the sidewall portions through the crown portion to the other sidewall portion to reinforce these portions, a belt and a tread successively superimposed on the crown portion outward in the radial direction of the tire; said tread having plural rows of blocks defined by plural circumferential grooves extending circumferentially of the tread and circumferentially spaced lateral grooves crossing said circumferential grooves and extending substantially in parallel with each other; said belt comprised of at least two main belt layers each containing inextensible cords arranged at a small cord angle with respect to an equator of the tire, the cords of said main belt layers being crossed with each other, and an auxiliary belt layer formed by spirally winding a rubberized ribbon ply containing 3 to 14 parallel arranged heat-shrinkable nylon cords therein on a circumference of the main belt layers over the full width while partially overlapping said ribbon ply in the widthwise direction, wherein an overlapped amount of the ribbon ply in said auxiliary belt layer is made larger in each zone of the tread substantially corresponding to each of said rows of blocks than in each zone of the tread substantially corresponding to each of said circumferential grooves.

2. The pneumatic radial tire according to claim 1, wherein said lateral grooves extends to converge toward the equator of the tire at an acute angle with respect to said circumferential groove.

3. The pneumatic radial tire according to claim 1, wherein said zone of the tread corresponding to said circumferential groove extends along the circumferential groove at a width corresponding to 50-150% of an opening width of the circumferential groove around a center thereof.

4. The pneumatic radial tire of claim 1, wherein said rubberized ribbon ply is spiral wound to double over itself in zones comprising tread ends.

5. The pneumatic radial tire of claim 1, wherein said auxiliary belt layer has a rigidity per unit width in zones corresponding to said rows of blocks at least 20% larger than in said zones corresponding to said circumferential grooves.

6. The pneumatic radial tire according to claim 1, wherein said main belt layers comprises inextensible cords arranged at cord angles of 15°-35° with respect to said equator of said tire.

7. The pneumatic radial tire according to claim 1, wherein said lateral grooves have a width and a depth no greater than a width and depth of said circumferential grooves.

8. The pneumatic radial tire according to claim 1, wherein said tread further comprises a pair of circumferentially extending ribs separated from each other by a centerline circumferential groove.

9. A high-speed running pneumatic radial tire comprising; a cylindrical crown portion, a pair of sidewall portions extending from both ends of the crown portion inward in the radial direction of the tire, a radial carcass extending from one of the sidewall portions through the crown portion to the other sidewall portion to reinforce these portions, a belt and a tread successively superimposed on the crown portion outward in the radial direction of the tire; said tread having plural rows of blocks defined by plural circumferential grooves extending circumferentially of the tread and circumferentially spaced lateral grooves crossing said circumferential grooves and extending substantially in parallel with each other; said belt comprised of at least two main belt layers each containing inextensible cords arranged at small cord angle with respect to an equator of the tire, the cords of said main belt layers being crossed with each other, and an auxiliary belt layer formed by spirally winding a rubberized ribbon ply containing a plurality of parallel arranged heat-shrinkable nylon cords therein on a circumference of the main belt layers over the full width while partially overlapping said ribbon ply in the widthwise direction, wherein an overlapped amount of the ribbon ply in said auxiliary belt layer is made larger in each zone of the tread substantially corresponding to each of said rows of blocks than in each zone of the tread substantially corresponding to each of said circumferential grooves, and said zone of the tread corresponding to said circumferential groove extends along the circumferential groove at a width corresponding to 50-150% of an opening width of the circumferential groove around a center thereof.

10. The pneumatic radial tire according to claim 9, wherein said ribbon ply contains 3-14 nylon cords.

11. The pneumatic radial tire of claim 9, wherein said rubberized ribbon ply is spiral wound to double over itself in zones comprising tread ends.

12. The pneumatic radial tire of claim 9, wherein said auxiliary belt layer has a rigidity per unit width in zones corresponding to said rows of blocks at least 20% larger than in said zones corresponding to said circumferential grooves.

13. The pneumatic radial tire according to claim 9, wherein said main belt layers comprise inextensible cords arranged at cord angles of 15°-35° with respect to said equator of said tire.

14. The pneumatic radial tire according to claim 9, wherein said lateral grooves have a width and a depth no greater than a width and depth of said circumferential grooves.

15. The pneumatic radial tire according to claim 9, wherein said tread further comprises a pair of circumferentially extending ribs separated from each other by a centerline circumferential groove.

* * * * *